United States Patent [19]

Amthor et al.

[11] Patent Number: 5,069,505
[45] Date of Patent: Dec. 3, 1991

[54] VEHICLE SEAT, ESPECIALLY AN AIR PASSENGER SEAT

[75] Inventors: Thomas Amthor, Rosengarten-Westheim; Erwin Neumann, Schwäbisch Hall; Wolfgang von Rolbicki, Geschlachtenbretzingen; Frank Starke, Schwäbisch Hall, all of Fed. Rep. of Germany

[73] Assignee: Keiper Recaro GmbH & Co., Fed. Rep. of Germany

[21] Appl. No.: 533,845

[22] Filed: Jun. 6, 1990

[30] Foreign Application Priority Data

Jun. 7, 1989 [DE] Fed. Rep. of Germany ....... 3918500

[51] Int. Cl.$^5$ .............................................. B64D 25/04
[52] U.S. Cl. ....................................... 297/216; 297/232
[58] Field of Search .............................. 297/216, 232; 248/188.1; 244/122 R, 118.6

[56] References Cited

U.S. PATENT DOCUMENTS

| 2,959,207 | 11/1960 | Brewster | 297/216 |
| 3,603,638 | 9/1971 | McGregor | 297/216 |
| 3,653,713 | 4/1972 | Reason et al. | 297/232 |
| 4,375,300 | 3/1983 | Long et al. | 297/232 |
| 4,444,441 | 4/1984 | Marrujo et al. | |
| 4,718,719 | 1/1988 | Brennan | |
| 4,861,103 | 8/1989 | Vallee | 297/232 X |
| 4,898,426 | 2/1990 | Schulz et al. | 297/232 X |

FOREIGN PATENT DOCUMENTS 0348096 12/1989 European Pat. Off. .
3239292 5/1983 Fed. Rep. of Germany ...... 297/216

Primary Examiner—Peter R. Brown
Attorney, Agent, or Firm—Wigman & Cohen

[57] ABSTRACT

A vehicle seat, especially an air passenger seat, has a front (1) and a rear (2) foot, at least on one side. These feet are connected together, in the area of their upper end, by means of a longitudinal strut (5). The longitudinal strut (5) has a fastening point (6) for a safety belt. The connection between the front foot (1) and the longitudinal strut (5) is designed to prevent rotation, and the connection between the rear foot (2) and the longitudinal strut (5) is designed as a rotary connection which permits motion about an axis that extends perpendicular to the direction of the seat. The rear foot (2) is curved against the front foot (1), between an upper and lower end region, and has a U-profile that is open towards the side.

20 Claims, 3 Drawing Sheets

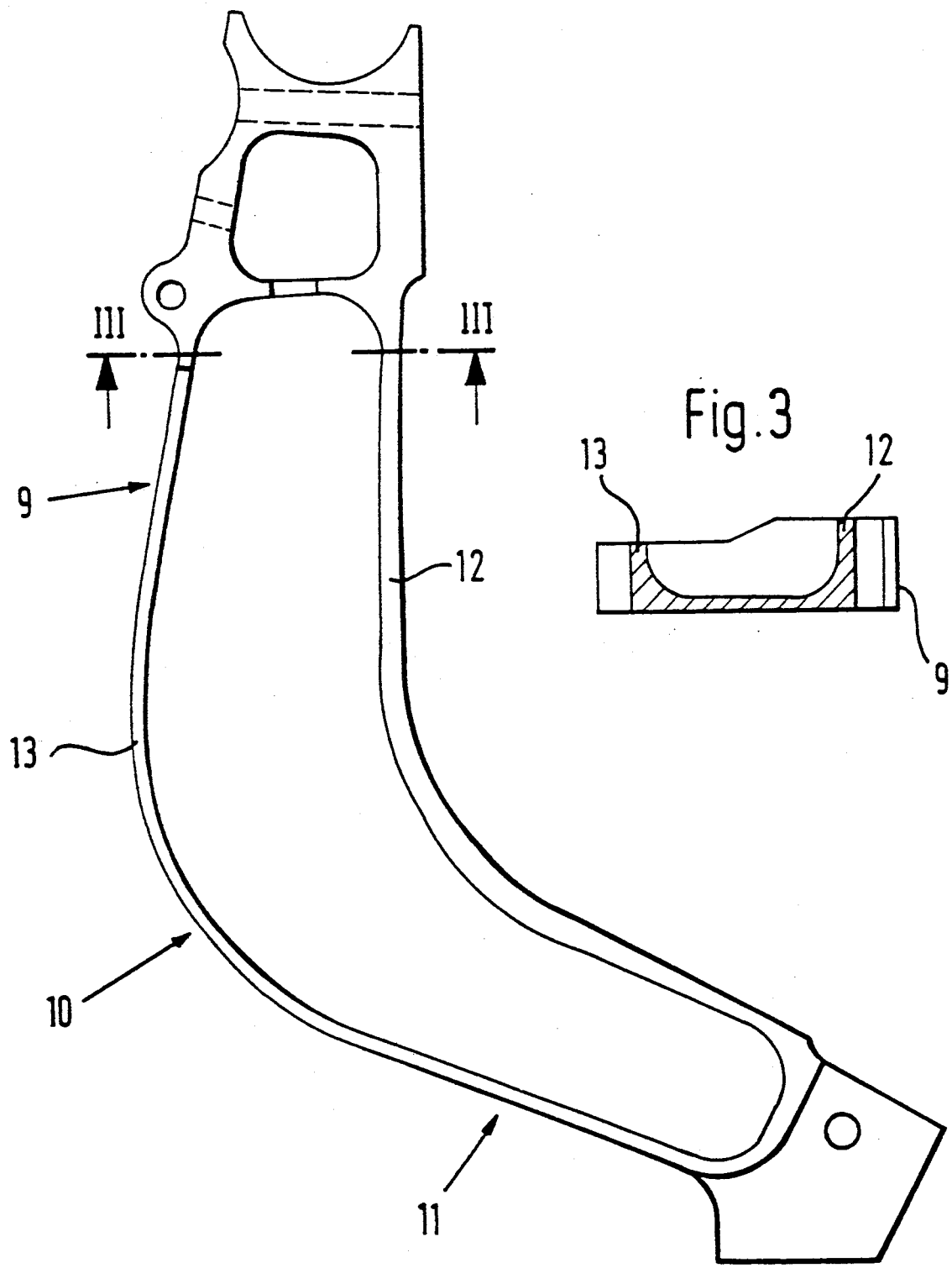

VEHICLE SEAT, ESPECIALLY AN AIR PASSENGER SEAT

BACKGROUND OF THE INVENTION

1. Field of the Invention

The invention relates to a vehicle seat, especially an air passenger seat.

2. Description of the Prior Art

Known air passenger seats include feet and seat dividers connecting them to form a rigid frame. Since the safety belt is fastened on this frame, the frame is exposed to very high stress in case of a crash.

OBJECTS AND SUMMARY OF THE INVENTION

It is therefor an object of this invention to improve vehicle seats, especially air passenger seats so that the stresses which occur in a crash can be managed by means of a structure that is lighter in weight than conventional structures.

Briefly stated, the inventive design of the rear foot of the present invention, together with the rotary connection between the upper end of the foot and the longitudinal strut, as well as the non-rotary connection between the forward foot and the longitudinal strut, leads to a defined deformation of the rear foot in the event of a crash, such that the irreversible energy conversion leads to a damping which substantially reduces the stress peaks and thus the stress on the individual parts of the seat frame.

A diagonal rod is provided to make more rigid the part which consists of the front foot and the longitudinal strut. This also results in a saving of weight. This diagonal rod is preferably hollow and has a rectangular, cross-section. It is here especially advantageous to attach the diagonal rod at the rear foot, since this achieves a still more favorable deformation behavior for the rear foot.

In a preferred embodiment, the connection between the rear foot, the longitudinal strut, and the rearward transverse strut, which is usually formed by a tube, permits rotary motion, but only by overcoming friction, the latter being very simply adjustable by means of strap retainers. In another preferred embodiment, a connecting rod is provided in addition to the diagonal rod.

Regardless of how the rear foot is designed and is connected to the longitudinal strut, a forward transverse strut is especially advantageous. Such a transverse strut makes it unnecessary to provide the tube with holes for the connecting screws and especially since such a strut provides an adaptive capability, which is important not only in view of unavoidable tolerances, but because the seats can have different widths. The same transverse strut can then be used for all the different seats.

BRIEF DESCRIPTION OF THE DRAWINGS

The invention is explained in more detail below by way of an embodiment shown in the drawings wherein:

FIG. 2 is an enlarged side view of the rear foot;

FIG. 3 is a cross-sectional view taken along lines III—III of FIG. 2;

DETAILED DESCRIPTION OF THE PREFERRED EMBODIMENT

Figure 1:
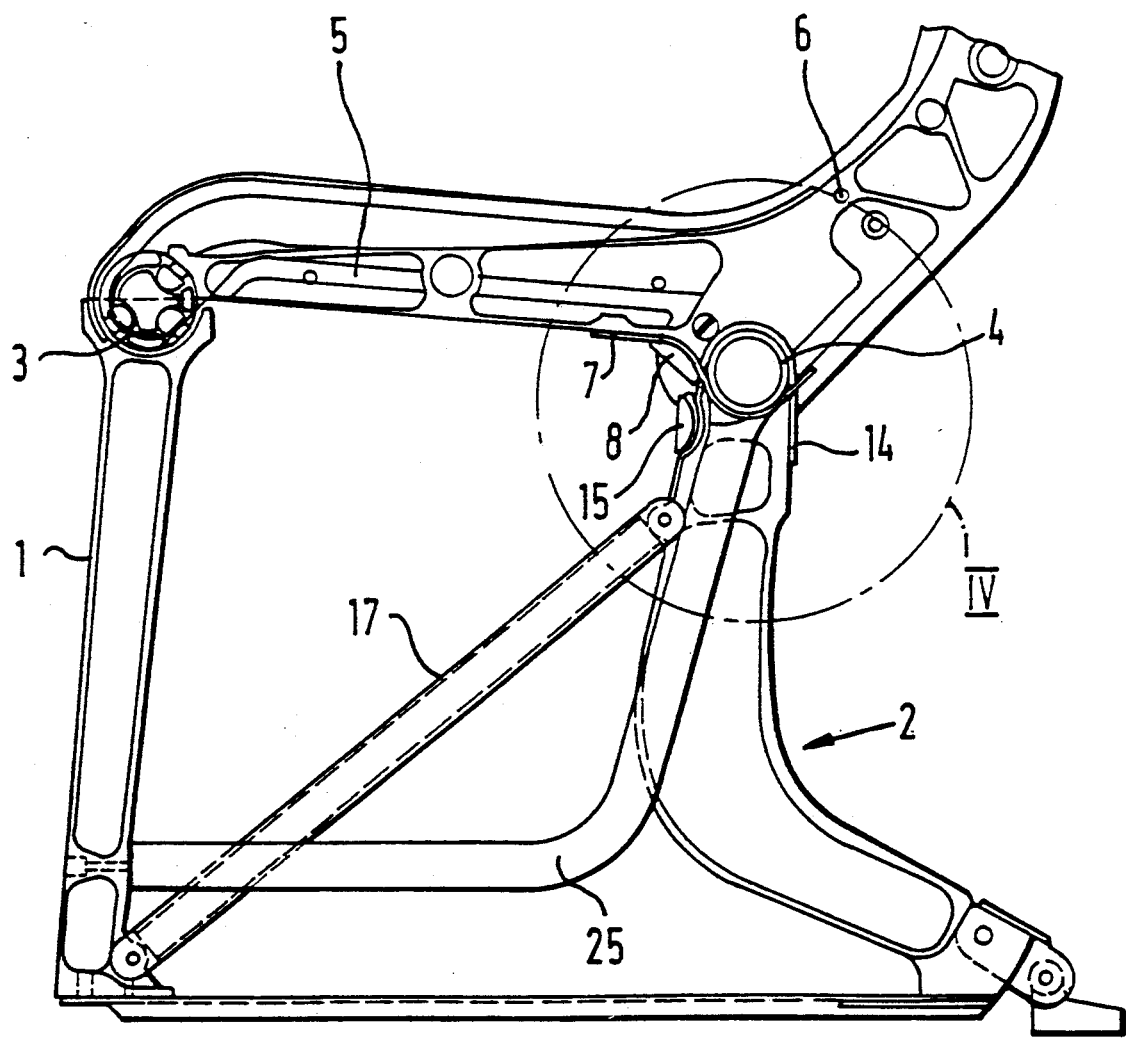
FIG. 1 is an incomplete side view of the vehicle seat structure according to the present invention.

Referring now to the drawings wherein like numerals indicate like elements throughout the several views there is shown in FIG. 1 an air passenger seat frame which includes a front foot 1 and a rear foot 2 on both sides of the seat, or, if several seats are disposed next to one another in a row, only on the two sides of the row. These feet are connected to a front transverse strut 3 and a rear transverse strut 4, which run parallel to one another in the direction that is transverse to the seat.

The rear transverse strut 4 lies lower than the front transverse strut 3. The two transverse struts 3 and 4 are each connected to one another by a seat divider 5 disposed at the side of the seat. This seat divider 5 extends beyond the rear transverse strut, at a slant rearwards and upwards, and supports both the back rest and the arm rest that is usually present. Furthermore, every seat divider 5 has a fastening point 6 for a safety belt in that section which protrudes rearward and upward over the rear transverse strut 4.

The front foot 1, preferably of aluminum, is straight, and is designed as a U-section rod between its lower end and a hemi-shell at its upper end. Here, the lower end is to be connected to a perforated bar. The seat divider 5 is a ribbed U-section support, is also made of aluminum. At its front end, it has a hemi-shell which is seated on the front transverse strut 3. The seat divider 5 also has a hemi-shell which is open downwards, for its placement on the rear transverse strut 4. The radius of curvature of this hemi-shell is equal to that of the rear transverse strut 4, which is designed as a cylindrical tube. A strap retainer 17 surrounds the rear transverse strut 4 on that side which is opposite the hemi-shell. Its two end sections are solidly connected to the underside and backside of the seat divider 5 by means of screws. Between the forward fastening point and the rear transverse strut 4, a retainer element 8 adjoins the strap retainer 7. The retainer element 8 can be tightened against the seat divider 5 by means of screws, which imparts the necessary tension to the strap retainer 7.

The upper end of the rear foot 2 is designed as a hemi-shell, whose radius of curvature is equal to that of the rear transverse strut 4, which lies in this hemi-shell. As shown in FIGS. 1 and 2, this hemi-shell is provided at the free end of the upper, straight section 9 of the rear foot 2, which extends approximately parallel to the forward foot 1, which is slightly inclined rearwards. The middle section 10, which adjoins the upper section 9, is curved in such a fashion that a straight, lower section 11, which adjoins it, runs at a slant rearwards and downwards, at an angle of about 25 degrees relative to the connecting line between the lower ends of the two feet 1 and 2. As shown in FIGS. 2 and 3, the rear foot has a U-shaped profile, open towards the outside, except in its two end sections, which are used to make a connection to the seat divider 5 and the perforated bar. The distance between the rear leg 12 of the cross-sectional profile of the front leg 13 increases to nearly twice its value towards the middle of the middle section 10. The wall thickness of the rear leg 12 also increases towards the middle of the middle section 10, though to a somewhat lesser extent. Furthermore, the length of the rear leg 12 is somewhat greater than the length of the front leg 13. It amounts to about 30% to 35% of the greatest width of the rear foot 2, which is milled of solid aluminum material. In this embodiment, in the area of the lower section 11, the front leg 13 encloses an angle of about 20 degrees with the connecting line between the lower end of the two feet 1 and 2, while the rear leg 12 encloses an angle of about 30 degrees with this line. In the area of the upper section 9, the front leg 13 is slanted rearwards by about 15 degrees with respect to the vertical.

Figure 4:
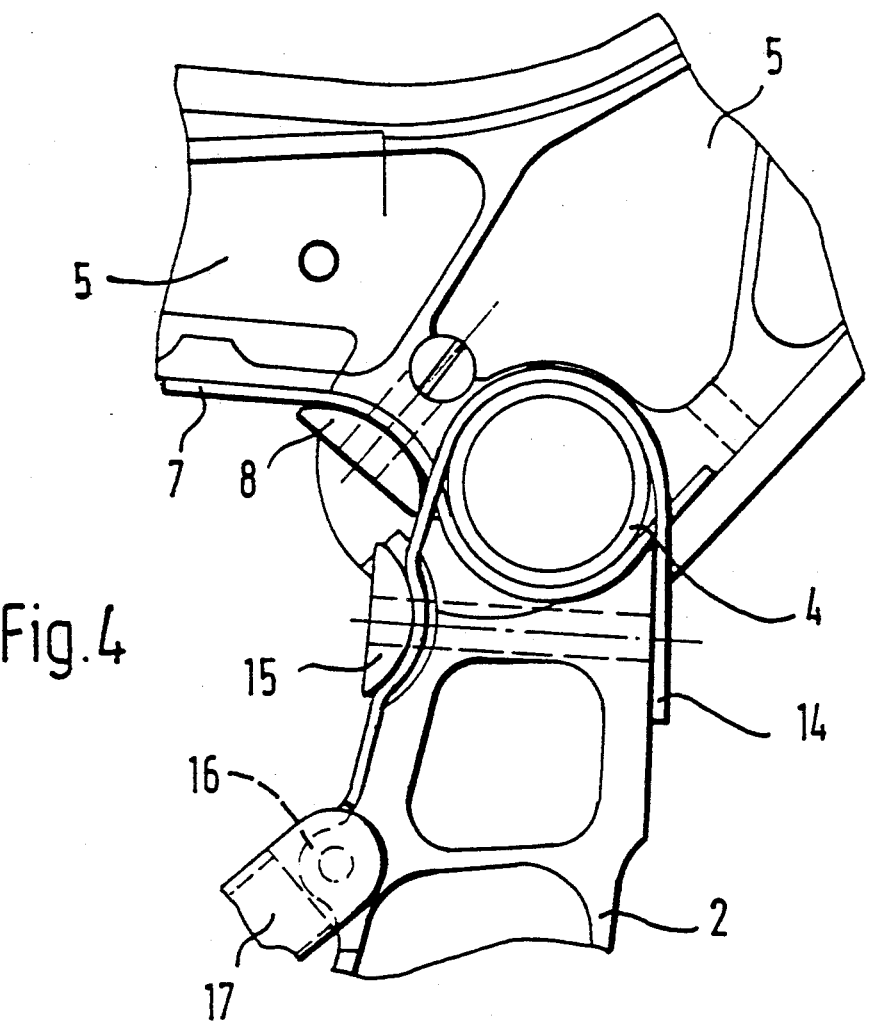
FIG. 4 is an enlarged side view of the connection of the rear foot and the longitudinal strut to the rear transverse strut.

As best seen in FIGS. 1 and 4, a retainer strap 14 surrounds the rear transverse strut 4 against the hemi-shell at the upper end of the rear foot 2. Its two end sections are secured to the rear foot 2 in front and in back by screws or the like. A clamping element 15 lies between the forward fastening point and the rear transverse strut 4 at the retainer strap 14, and is tightened against the rear foot 2 by means of screws. As a result, the retainer strap 14 obtains the required tension.

Below the front fastening point of the retainer strap 14, an eyelet 16 is integrally formed on the rear foot 2, for attaching the upper end of a diagonal rod 17. The other end of rod 17 is attached to the lower end of the front foot 1. The straight diagonal rod 17 is a double-chamber hollow rod with a rectangular cross-section.

Figure 5:
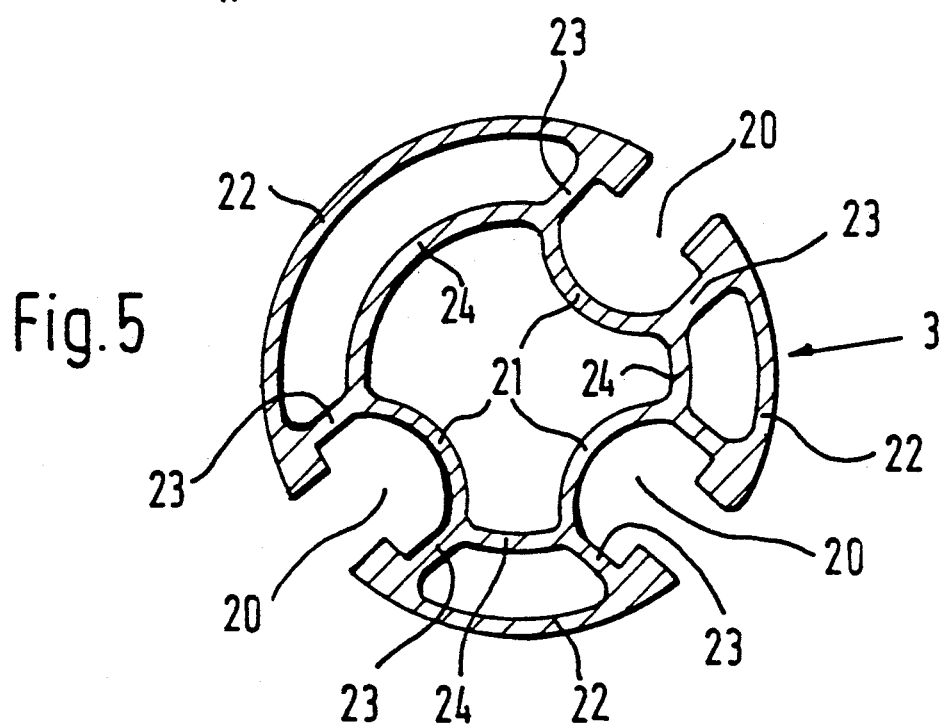
FIG. 5 is an enlarged frontal view of the forward transverse strut.

FIG. 5 is an enlarged view showing the front transverse strut 3 as a cylindrical tube which is formed with three similarly shaped longitudinal grooves 20, spaced from one another in the circumferential direction. Two of these longitudinal grooves 20 are displaced by about 50 degrees with respect to the vertical, clockwise or respectively counter-clockwise. They are used to make a connection to the front foot 1, as shown in FIG. 1. The third longitudinal groove 20, which is disposed approximately diagonally to the longitudinal groove that is displaced clockwise, is used to make a connection to the seat divider 5.

The cross-sectional profile of the longitudinal grooves 20 differs from a hammer-head profile only by the shape of the groove base 21, which has a convex cylindrical curvature as viewed from the tube center. The front transverse strut 3 has a cylindrically shaped outside casing 22, whose walls are thicker in the area of the parallel flanking constriction of the longitudinal grooves 20. The longitudinal grooves 20 are widened following this constriction. Here, they are bounded by parallel wall sections 23, which are followed by the grooved base 21. At the point where the wall sections 23 extend into the grooved base 21, an inside casing 24 is integrally attached. The latter is disposed concentrically with the outside casing 22, and forms rigidification ribs between the longitudinal grooves 20.

Hammerhead screws are inserted into the longitudinal grooves 20 to make a connection between the front foot 1 and the seat divider 5 on the one hand and the front transverse strut 3 on the other hand. These screws go through holes in the hemi-shells of the above-mentioned parts, and connect the latter to the integrally formed front transverse strut 3, so as to be secure against rotation.

In the event of a crash, the rear foot 2 is distended. The rear leg portion 12 is subject to tensile stress, while the front leg portion 13 is subject to compressive stress. The web which connects the two legs 12 and 13 is likewise exposed to tensile stress in the area which adjoins the rear leg 12. In a crash, the rear foot 2 therefore not only distends, but its middle section 10 is also bent outwardly in the area of the front leg 13 and in the adjoining webbed zone, to cause a considerable permanent deformation to occur. In connection with this deformation, the upper end of the rear foot 2 is rotated relative to the rear transverse strut 4. Consequently, a part of the energy is converted into frictional heat. The shift of the rear transverse strut 4, due to the distention of the rear foot 2, occurs approximately along a circular path about the lower end of the front foot 2. The diagonal rod 10 here also swivels about its attachment point at the front foot 1. On the other hand, the angle between the front foot 1 and the seat divider 5 remains unchanged. A connecting rod 25, formed by a tube, serves as a holder for baggage. This connecting rod 25 extends from the rear transverse strut 4 rear transverse strut 4 downwards, approximately parallel to the front foot 1. Then it is bent forwards, and from this banding point runs parallel to the connecting line between the lower ends of the rear foot 2 and the front foot 1 to the latter, to which it is solidly connected above the attachment point for the diagonal rod 17.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat, especially an air passenger seat, comprising a front foot and a rear foot, at least on one side, which can be connected to the vehicle floor in the area of their lower end, and which are connected to one another in the area of their upper end, by means of a longitudinal strut, which extends upward at a slant beyond the connecting point with the rear foot, such that the connection between the front foot and the longitudinal strut prevents rotation about an axis that runs in the direction transverse to the seat, and further including:
   a) rotary means for connecting the rear foot and the longitudinal strut which permits motion about an axis that runs in the direction transverse to the seat; wherein
   b) the rear foot is curved in a middle section between an upper and lower end region in the direction of the front foot, has a U-shaped profile that is open towards the side and has a rear leg, a front leg and a webbed zone between said legs, whereby in the event of a crash the middle section is bent outwardly in the area of the front leg and the adjoining webbed zone.

2. The vehicle seat of claim 1, wherein the upper region, which lies between this middle section and the connecting point to the longitudinal strut runs essentially parallel to the front foot.

3. The vehicle seat of claim 2, wherein the section of the rear foot between the middle section and the lower connecting point, encloses an angle of from about 20 degrees to 40 degrees with the connecting line between the points where the lower ends of the rear foot and the front foot are connected to the vehicle floor.

4. The vehicle seat of claim 2, wherein the distance between the two legs of the U-shaped profile of the rear foot increases from the end sections of the rear foot towards the middle of the middle section.

5. The vehicle seat of claim 4, wherein the distance between the two legs of the U-shaped profile of the rear foot is greater in the upper section than in the lower section of the rear foot.

6. The vehicle seat of claim 4, wherein the wall thickness of the rear leg of the rear foot increases from the end sections of the rear foot towards the middle of this middle section.

7. The vehicle seat of claim 1, further including a diagonal rod, the two ends of said diagonal rod are connected to the lower end of the front foot, and, the upper section of the rear foot, respectively, so that each can pivot separately about an axis which extends in the direction transverse to the seat.

8. The vehicle seat of claim 7, wherein said diagonal rod is hollow and has a rectangular profile, said rod is attached to the rear foot at that front side which faces the front foot, at a distance from the connecting point between the longitudinal strut and said rear foot.

9. The vehicle seat of claim 1, wherein the front foot is connected by way of a front transverse strut and the rear foot is connected by way of a rear transverse strut to said longitudinal strut.

10. The vehicle seat of claim 9, wherein the rear transverse strut is a cylindrical tube, which is contacted by the upper end of the rear foot and by the longitudinal strut, which are each retained in position by means of separate retainer straps so that friction locks them against rotational motion.

11. The vehicle seat of claim 9, further including a bent connecting rod having an upper section which extends approximately parallel to the front foot and is connected to the rear transverse strut and/or the longitudinal strut, and having a lower section which extends from the bent middle piece approximately parallel to the connecting line between the lower ends of the front and rear feet, and is connected to the lower foot at a distance from its lower end.

12. The vehicle seat of claim 9, wherein the front transverse strut is a tube which is provided with at least one longitudinal groove which is bounded by wall sections formed integrally with an outside casing of the tube, said wall section having a cross-sectional profile that results in an undercut, said tube having an inside casing, which is situated at a distance within the outside casing and which is integrally formed with the wall sections which bound the longitudinal groove.

13. The vehicle seat of claim 12, wherein said inside casing lies concentrical to the outside casing.

14. The vehicle seat of claim 12, wherein said inside casing adjoins the wall sections at the transition from the wall sections which bound the longitudinal groove to the wall section which form the base of the groove.

15. The vehicle seat of claim 12, wherein the wall section which forms the base of the groove, has a convex-cylindrical curvature towards the groove.

16. The vehicle seat of claim 12, wherein the longitudinal groove has a cross-sectional profile which resembles a hammer head.

17. The vehicle seat of claim 12, wherein said tube has three longitudinal grooves situated at a distance along the circumferential direction, of which two are provided for the connection to the front foot, and the third one is provided for a connection to the longitudinal strut.

18. The vehicle seat according to claim 1, including means for securing a seat belt thereto.

19. The vehicle seat according to claim 18, wherein said means for securing a seat belt is provided in the longitudinal strut portion which extends beyond the connection with the rear foot.

20. The vehicle seat according to claim 18, wherein said tube has three longitudinal grooves situated at a distance along the circumferential direction, of which two are provided for the connection to the front foot, and the third one is provided for a connection to the longitudinal strut.

* * * * *

UNITED STATES PATENT AND TRADEMARK OFFICE
CERTIFICATE OF CORRECTION

PATENT NO. : 5,069,505
DATED : December 3, 1991
INVENTOR(S) : Thomas AMTHOR et al It is certified that error appears in the above-identified patent and that said Letters Patent is hereby corrected as shown below:

Claim 1, column 4, line 49, after "zone" insert --extending--; and after "between" insert --the innermost ends of--.

Signed and Sealed this

First Day of June, 1993

Attest:

MICHAEL K. KIRK

Attesting Officer     Acting Commissioner of Patents and Trademarks